# United States Patent Office 3,142,680
Patented July 28, 1964

3,142,680
18 - AZIDO - 18 - DESOXY-RESERPIC-ACID-ESTERS AND PROCESS FOR THE PREPARATION OF SUCH COMPOUNDS
Gustav Lettenbauer, Lampertheim, Hesse, Alfred Popelak, Mannheim, Wolfgang Schaumann, Mannheim-Waldhof, and Annemarie Ribbentrop, Mannheim, Germany, assignors to C. F. Boehringer & Soehne G.m.b.H., Mannheim-Waldhof, Germany, a German corporation
No Drawing. Filed Nov. 15, 1962, Ser. No. 238,032
Claims priority, application Germany Nov. 22, 1961
10 Claims. (Cl. 260—287)

This invention relates to 18-azido-18-desoxy-reserpic-acid-esters and their salts and to a method of preparing the same.

The new compounds exhibits a surprisingly good tranquilizing effect and are useful as a medicament in anxiety and tension states. The 18-azido-18-desoxy-reserpic-acid-esters produce a calming effect usually free of lethargy and hang-over and do not significantly lower the blood pressure. The compounds of the invention are characterized by a lack of toxicity over a wide range of dosages and in particular by the reduced frequency and/or severity of certain reserpine side effects. While reserpine because of its tranquilizing activity inhibits to some degree secondarily induced reactions, it simultaneously potentiates the hypnotic effect of subliminal doses of urethane. The compounds in accordance with the invention do not have a hypnotic-potentiating effect unless they are administered in extremely high amounts. The compounds of the invention which have tranquilizing action with few side effects and which, in contrast to the conventional reserpine derivatives do not have blood pressure reducing activity or hypnotic potentiating effects constitute particularly valuable therapeutic agents.

The compounds of the invention have the formula:

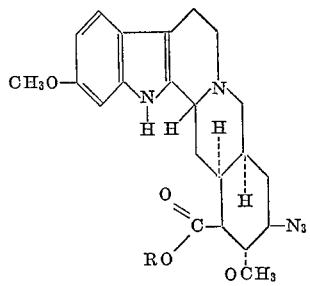

wherein R indicates an alkyl group having 1–5 C-atoms which alkyl group may be further substituted as for example by an alkoxy radical or an aryl or aralkyl group.

The new compounds (I) as set out above may exist in one of several forms, that is the compounds may have the "normal" configuration with respect to the azido group and the C–18 atom as has been set out above or the epi-configurations (Ia and Ib) as set out below:

(Ia)
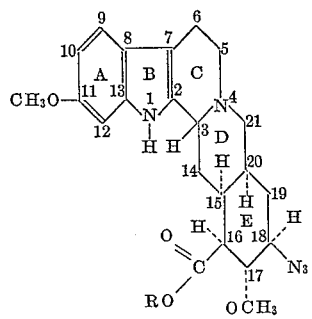

(Ib)
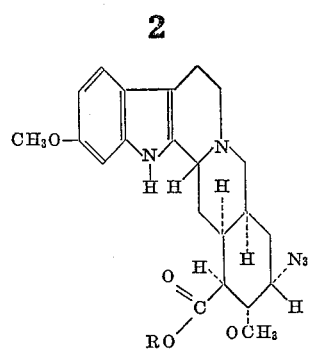

The new epi-azido-18-desoxy-reserpic acid esters of the formula:

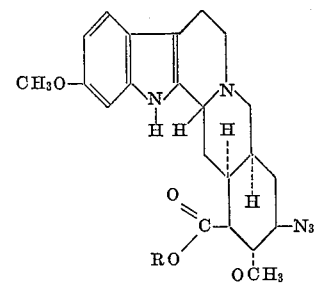

can be produced by reaction of a compound having the formula:

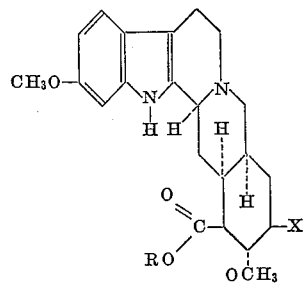

respectively, wherein R is as above defined and X represents an acid radical with an alkali azide and in particular with an alkali metal azide, as for example sodium or potassium azide. The reaction is preferably carried out with the sulfonic acid esters of reserpic acid. The reaction is effected merely by heating the reaction components together in a suitable solvent, preferably dimethyl formamide and preferably under exclusion of air.

The reactive esters of reserpic acid used as starting materials may, be prepared by any of the conventional methods. One suitable method consists of reacting the methyl ester of reserpic acid with the corresponding N-acyl-imidazole in the presence of an alkali metal hydride. The ester

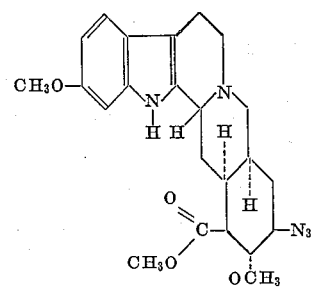

wherein R is a methyl group of this invention has particular utility as a pharmaco-dynamic agent and constitutes a particularly potent tranquilizing drug that may be administered in mental and emotional upsets with little danger of serious side effects.

Therapeutically useful salts of the new 18-azido-18-desoxy-reserpic acid esters can be prepared in the customary manner, for example by reaction with a mineral acid as for instance hydrochloric acid, phosphoric acid, nitric acid, etc. or an organic acid as for instance oxalic acid, maleic acid, tartaric acid, etc.

It is also possible to prepare the compounds

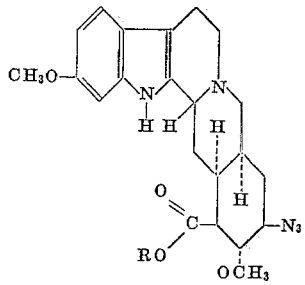

by saponification of the 18-azido-desoxy-reserpic acid ester

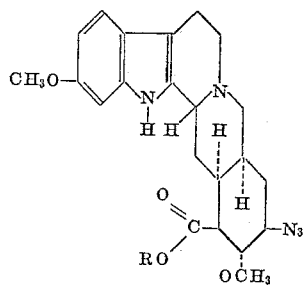

to form the acid

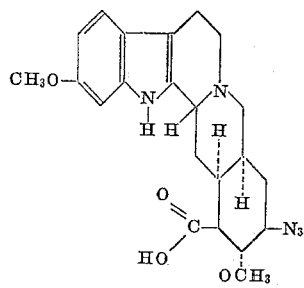

respectively and subsequently esterifying the acid to produce the desired ester.

The novel compounds in accordance with the invention may be incorporated into anti-excitory compositions administerable as oral preparations or parenterally.

For oral preparations capsules or tablets are made up containing the active therapeutic ingredient. Besides the active ingredient, the table may contain the usually included excipients or diluents as well as a disintegrating agent.

Concerning compositions intended for parenteral use, these may be made up lyophilized or dry form reconstitution with water to make up the desired solution or as an aqueous solution for immediate use.

In addition to the active ingredient and diluent, the compositions may contain a stabilizer, a preservative, and a buffering agent.

The invention is illustrated by the following examples with regard to certain preferred embodiments of the invention.

EXAMPLE 1

6.33 g. (0.01 mol) 18-O-brosyl-methylreserpate (melting point 219° C.) are dissolved in 60 ml. absolute dimethyl-formamide, 1.3 g. (0.2 mol) sodium azide added and the resulting solution heated for 3 hours under nitrogen to 100° C. After cooling 600 ml. water are added, followed by extraction with methylene chloride. The combined methylene-chloride extracts are washed several times with water, dried over sodium sulfate and evaporated to dryness, using vacuum. The residue is recrystallized from isopropanol-methylenechloride. There is obtained 3.8 g. of 18-desoxy-18-azido methylreserpate having a melting point of 234–235° C. The yield amounts to 87% of theory.

$[\alpha]_D^{21} = -42.3$ (c.=1 in chloroform)

$C_{23}H_{29}N_5O_4$ (439.5)

|   | Calculated | Found |
|---|---|---|
| C | 62.85 | 62.81 |
| H | 6.65 | 6.84 |
| N | 15.94 | 16.01 |

The bitartrate salt prepared from 18-dexoxy-18-azido methylreserpate by methods known to the art has a melting point of 185–187° C.

EXAMPLE 2

1.3 g. (0.02 mol) sodium azide are added to a solution of 5.68 g. 18-O-tosyl-methyl-reserpate (melting point 225° C.) in 60 ml. absolute dimethyl formamide and the resulting solution heated for 6 hours under nitrogen to 100° C. The heated solution is processed substantially as described in Example 1. There is obtained 18-desoxy-18-azido methylreserpate having a melting point of 234–235° C. in an 85% yield.

EXAMPLE 3

To a solution of 1.5 g. 18-desoxy-18-bromo-methyl-reserpate (melting point 219–220° C.) $[\alpha]_D^{20} = -101$ (c.=1 in chloroform) dissolved in 50 ml. dimethylformamide, there is added 1.5 g. sodium azide and the mixture heated for 2 hours under nitrogen to 100° C. The cooled reaction mixture is treated with 200 ml. water and extracted by shaking with methylene chloride. The methylene chloride extract is then washed with water, dried over sodium sulfate and brought to dryness in vacuo. The residue is recrystallized from isopropanol-methylene chloride. There is obtained 1.3 g. of 18-desoxy-18-azido-methyl-reserpate having a melting point of 234° C. Chromatographic analysis shows that the 18-desoxy-18-azido-methyl-reserpate is the 18-epi-compound. It is identical with the compound obtained in accordance with Examples 1 and 2.

EXAMPLE 4

1.35 g. 18-O-epi-brosyl-methylreserpate having a melting point of 210° C. [J. Am. Chem. Soc. 83, 2699 (1961)] and 135 g. sodium azide are dissolved in 30 ml. absolute dimethyl formamide and the solution heated for 2 hours to 100° C. The cooled reaction mixture is treated with 100 ml. water and extracted by shaking with methylene chloride. The methylene chloride extracts are washed several times with water, dried over sodium sulfate and concentrated to dryness in vacuo. The residue (0.85 g.) is recrystallized from diisopropyl ether-methylene chloride. The "normal" 18-desoxy-18-azido-methylreserpate obtained forms colorless needles having a melting point of 214–215° C. (decomposition).

$[\alpha]_D^{20} = -78.4$ (c.=1 in chloroform)

$C_{23}H_{29}N_5O_4$ (439.5)

|   | Calculated | Found |
|---|---|---|
| C | 62.85 | 62.51 |
| H | 6.65 | 6.64 |
| N | 15.94 | 16.03 |

EXAMPLE 5

1.85 g. 18-desoxy-18-epi-bromo-methylreserpate (melting point 218–220° C., $[\alpha]_D^{20} = +5.6$ (c.=1 in chloroform) and 1.85 g. sodium azide are added to 30 ml. absolute dimethyl-formamide and heated for 2 hours to 100° C. After cooling, the reaction mixture is worked up as described in Example 4. 18-desoxy-18-azido-methylreserpate, melting at 214–215° C. is obtained in an amount of 1.3 g.

EXAMPLE 6

*18-Azido-18-Desoxy-Reserpic-Acid-Ethyl-Ester*

2 g. 18-azido-18-desoxy-methylreserpate (melting point 215° C.) in 100 ml. 1 N alcoholic potash lye are refluxed under nitrogen for 90 minutes. After cooling to 0° C., an equivalent quantity of hydrochloric acid is added and the solution concentrated in vacuo. The residue is treated with isopropanol-methylene chloride, the undissolved potassium chloride filtered off and the filtrate evaporated to dryness. The crystalline residue, consisting of 18-azido-18-desoxy-reserpic acid is suspended without further purification in 150 ml. methylene chloride and treated with a solution of diazo-ethane in methylene chloride in excess. The mixture is allowed to stand for 2 hours at room temperature, whereupon the suspended acid goes completely into solution. The excess diazoethane is thereafter decomposed with several drops of acetic acid and the methylene-chloride solution washed with 1 N ammonia solution followed by washing with water. The resulting solution dried over sodium sulfate is concentrated in vacuo to about 20 ml. The concentrate is chromatographically purified using a column of 10 g. basic aluminum oxide (activity stage III, Woelm) under use of methylene chloride. The extracted material is dried in vacuo and the residue recrystallized from diisopropylethermethylene chloride. The yield obtained amounts to 1.1 g. The pure compound melts at 202° C. (decomposition).

$[\alpha]_D^{20} = 64.6 \pm 0.5$ (CHCl$_3$; c.=1)

$C_{24}H_{31}N_5O_4$ (453.55)

|   | Calculated | Found |
|---|---|---|
| C | 63.56 | 63.73 |
| H | 6.89 | 6.89 |
| N | 15.44 | 15.32 |

EXAMPLE 7

*18-Epi-Azido-18-Desoxy-Reserpic Acid-Ethyl Ester*

(a) 5.9 g. of 18-O-brosyl-reserpic acid-ethylester (melting point 213–216° C.) are heated in 30 ml. dimethyl formamide together with 3 g. sodium azide under nitrogen for 2 hours to 100–110° C. After cooling, the mixture is treated with 400 ml. methylene chloride and the solution washed with several portions of water. The solution obtained is dried over sodium sulfate and further dried in vacuo. The residue (3.75 g.) is recrystallized from isopropanol. The pure compound (about 3 g.) melts at 208–210° C.

$[\alpha]_D^{20} = -121 \pm 0.6$ (c.=1; CHCl$_3$)

$C_{24}H_{31}N_5O_4$ (453.55)

|   | Calculated | Found |
|---|---|---|
| C | 63.56 | 63.82 |
| H | 6.89 | 6.91 |
| N | 15.44 | 15.15 |

(b) A mixture of 20 g. 18-epi-azido-18-desoxymethylreserpate and 200 ml. 1 N alcoholic potash lye is refluxed under nitrogen for one hour. Thereafter the solution is cooled to 0° C., neutralized with 100 ml. 2 N hydrochloric acid and dried in vacuo. The dry residue is taken up in mixture of 200 ml. isopropanol and 300 ml. methylene chloride with heating in a water bath. The undissolved potassium chloride is separated by filtering and the filtrate concentrated in vacuo until all of the methylene chloride has been removed. The isopropanol solution is subjected to crystallization. There is obtained 19.2 g. of 18-epi-azido-18-desoxy-reserpic acid. The pure acid recovered following recrystallization from isopropanol melts at 239–240° C.

$[\alpha]_D^{20} = -84.1 \pm 0.6$ (c.=1; CHCl$_3$)

$C_{22}H_{27}N_5O_4 \cdot \frac{1}{2} H_2O$ (434.5)

|   | Calculated | Found |
|---|---|---|
| C | 60.83 | 60.95 |
| H | 6.49 | 6.83 |
| N | 16.12 | 15.98 |

2 g. of the acid are suspended in 150 ml. methylene chloride and treated with an excess of diazoethane. The mixture is worked up as set out above in Example 6. In this manner there is obtained about 1.8 g. of 18-epi-azido-18-desoxy-reserpic acid ethyl ester having a melting point of 208–210° C.

EXAMPLE 8

*18-Azido-18-Desoxy-Reserpic Acid-n-Butylester*

1.5 g. of the 18-azido-18-desoxy-reserpic-acid obtained according to Example 6 are suspended in 200 ml. methylene chloride and treated with a solution of diazobutane in methylene chloride, the diazobutane being present in excess. The mixture is processed as set out above in Example 6. The butyl ester is recrystallized from diisopropyl ether-methylene chloride. The compound melts at 204° C. (decomposition). The yield recovered amounts to 1.4 g.

$[\alpha]_D^{20} = 62.3 \pm 0.5$ (c.=2; CHCl$_3$)

$C_{26}H_{35}N_5O_4$ (481.6)

|   | Calculated | Found |
|---|---|---|
| C | 64.84 | 64.66 |
| H | 7.32 | 7.98 |
| N | 14.54 | 14.41 |

EXAMPLE 9

*18-Epi-Azido-18-Desoxy-Reserpic-Acid-n-Butylester*

(a) 3 g. of the 18-epi-azido-18-desoxy-reserpic acid obtained according to Example 7(b) are dissolved in 80 ml. of a mixture of absolute methanol and methylene chloride (1:1) and treated with an excess of a solution of diazobutane in methylene chloride. The mixture is allowed to stand overnight and is thereafter worked up as described in Example 6. The 18-epi-azido-18-desoxy-reserpic acid-n-butylester recrystallized from isopropanol-methylene chloride melts at 231° C. The yield amounts to 2.8 g.

$[\alpha]_D^{20} = -31.2 \pm 0.6$ (c.=1; CHCl$_3$)

$C_{26}H_{35}N_5H_4$ (481.6)

|   | Calculated | Found |
|---|---|---|
| C | 64.84 | 64.93 |
| H | 7.32 | 7.17 |
| N | 15.54 | 15.14 |

(b) 3.3 g. 18-O-brosyl-reserpic-acid-n-butyl ester (melting point 213° C. and 1.5 g. sodium azide are heated in 30 ml. dimethyl formamide under nitrogen for 3 hours to 100–110° C. The reaction mixture is processed as set out in Example 7(a). The residue (1.95 g.=83%) is recrystallized from isopropanol-methylene chloride. The ester recovered has a melting point of 230–231° C.

EXAMPLE 10

*18-Epi-Azido-18-Desoxy-Reserpic Acid-Methoxy-Ethyl Ester*

3 g. 18-O-brosyl-reserpic acid-methoxy-ethyl-ester and 1.5 g. sodium azide are heated in 30 ml. absolute dimethyl formamide under nitrogen for 2½ hours to 100–110° C.

The further processing is carried out analogous to that described in Example 7(a). The raw product (1.87 g.) is recrystallized from isopropanol-methylene chloride. The pure ester recovered has a melting point of 163° C.

$[\alpha]_D^{20} = -36.8 \pm 0.6$ (c.=1; $CHCl_3$)
$C_{25}H_{33}N_5O_5$ (483.55)

|   | Calculated | Found |
|---|---|---|
| C | 62.10 | 62.08 |
| H | 6.88 | 6.98 |
| N | 14.48 | 14.68 |

EXAMPLE 11

*18-Epi-Azido-18-Desoxy-Reserpic-Acid-Benzyl-Ester*

3 g. 18-O-brosyl-reserpic acid-benzyl ester and 1.5 g. sodium azide are heated in 25 ml. absolute dimethyl formamide for 3 hours under nitrogen to 100–110° C. After further processing according to Example 7(a), the raw product (3.89 g.) is recrystallized from isopropanol. There is obtained an end product in the form of fine needles having a melting point of 217° C.

$[\alpha]_D^{20} = -47.2 \pm 0.5°$ (c.=2; $CHCl_3$)
$C_{29}H_{33}N_5O_4$ (515.6)

|   | Calculated | Found |
|---|---|---|
| C | 67.55 | 67.33 |
| H | 6.45 | 6.53 |
| N | 13.58 | 13.78 |

EXAMPLE 12

*18-Epi-Azido-18-Desoxy-Reserpic-Acid-Phenyl Ester*

2.5 g. 18-O brosyl-reserpic-acid-phenyl ester and 1.2 g. sodium azide are heated in 25 ml. absolute dimethyl formamide for 3 hours under nitrogen to 110° C. After following processing according to Example 7(a), the raw product (1.55 g.) is recrystallized out of isopropanol. The pure product recovered has a melting point of 240° C.

$[\alpha]_D^{20} = -129.8 \pm 0.3$ (c.=1; $CHCl_3$)
$C_{28}H_{31}N_5O_4$ (501.6)

|   | Calculated | Found |
|---|---|---|
| C | 67.04 | 66.83 |
| H | 6.32 | 6.60 |
| N | 13.96 | 14.03 |

We claim:
1. A member selected from the group consisting of 18-azido-18-desoxy-reserpic acid esters of the formulae:

(Ia)
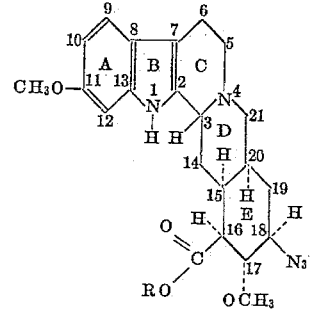

(Ib)
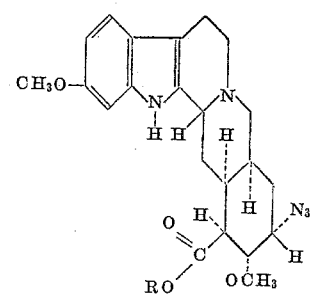

wherein R is a member selected from the group consisting of alkyl, lower alkoxy alkyl, wherein the alkyl groups are those having from 1–5 carbon atoms, phenyl and benzyl and a non-toxic addition salt thereof.
2. 18-azido-18-desoxy-reserpic acid-methyl ester.
3. 18-epi-azido-18-desoxy-reserpic acid-methyl ester.
4. 18-azido-18-desoxy-reserpic acid-ethyl ester.
5. 18-epi-azido-18-desoxy-reserpic acid-ethyl ester.
6. 18-azido-18-desoxy-reserpic acid-n-butyl ester.
7. 18-epi-azido-18-desoxy-reserpic acid-n-butyl ester.
8. 18-epi-azido-18-desoxy-reserpic acid-methoxy ethyl ester.
9. 18-epi-azido-18-desoxy-reserpic acid-benzyl ester.
10. 18-epi-azido-18-desoxy-reserpic acid-phenyl ester.

No references cited.